United States Patent Office 3,494,773
Patented Feb. 10, 1970

3,494,773
METHOD OF MAKING A HOMOGENEOUS EDIBLE FIBROUS PROTEIN CASING
Albert Courts, Solihull, and Noel James Bradshaw, Sharnbrook, England, assignors to Lever Brothers Company, New York, N.Y., a corporation of Maine
No Drawing. Continuation-in-part of application Ser. No. 696,085, Jan. 5, 1968, which in turn is a continuation of application Ser. No. 412,232, Nov. 18, 1964. This application Sept. 19, 1968, Ser. No. 761,406
Claims priority, application Great Britain, Nov. 20, 1963, 45,873/63
Int. Cl. A22c *13/00*
U.S. Cl. 99—176                       6 Claims

ABSTRACT OF THE DISCLOSURE

An edible food casing such as sausage casing is prepared by combining an edible fibrous collagen and an edible alginate and extruding an aqueous suspension thereof into a precipitating bath.

---

This application is a continuation-in-part of application Ser. No. 696,085 filed on Jan. 5, 1968, which in turn is a continuation of application Ser. No. 412,232 filed on Nov. 18, 1964 now abandoned.

This invention relates to casings and particularly to artificial edible food casings.

Sausage casing is an example of an edible food casing and is conventionally made from animal intestine (the so-called "natural casings"). In practice, natural casings suffer from a number of disadvantages: for example they require careful cleaning and preparation, are irregular in diameter, and are in short supply and are rather expensive.

Artificial edible sausage casings, that is, casings which are not obtained from the natural intestine, have been made, but it has been found difficult to make a casing having a suitable degree of shrinkage when it is cooked, for example by frying or boiling. On cooking, sausage meat decreases in volume by about 15%, and it is desirable that the sausage casing should shrink by an amount sufficient to keep it in contact with the sausage meat; on the other hand, shrinkage should not be so great that the casing is split and releases the meat.

We have now found that an improved casing may be prepared, comprising an edible fibrous collagen protein and alginate.

The casings of the invention comprise a continuous phase of alginate containing a net-work of collagen fibres. This structure is attained by the extrusion of a preformed mixture of the materials, in which the alginate has acted on and combined with the collagen. The modified collagen fibres so formed are readily extruded, aided by the lubricating action of the alginate in the extrusion die, and form a homogeneous and strong casing.

The concept of the invention is to prepare a mixture of two materials, collagen and alginate, in which each of the components modifies the other with respect to the properties shown during extrusion and in the final casing.

Casings on which alginate is present by application after extrusion and for post-extrusion purposes not incorporation in a pre-mix, have been proposed, as in Patent No. 2,988,451 to Zahn and Patent No. 3,123,483 to McKnight. Zahn is interested in the production of sausage casings which are readily removable, for use on those kinds of sausages where the casing is not eaten with the sausage. He applies alginate to a casing formed by extrusion of an unmodified collagen dough, applying at most 3% of alginate with respect to the collagen. His collagen forms a layer on the collagen on the inside of the casing which prevents adhesion of the casing to the meat of a sausage and makes possible ready stripping. Apart from this essential difference of applying a layer of alginate to a formed casing of unmodified collagen the amount applied is such that if the same amount was incorporated in the pre-mixing stage which is an essential characteristic of the invention then it would have no useful effect. A minimum of 10% alginate is required in the process of the invention. Such an amount of alginate is sufficient to modify the whole of the collagen to a noticeable and useful extent, though of course it is preferred to use higher amounts, up to 60% related to the collagen.

McKnight discloses the use of carboxymethylcellulose applied to an already formed collagen casing. Carboxymethylcellulose is in some respects a comparable material to alginate, but essential differences exist such, for example, as the fact that alginate, containing carboxylic acid groups, would be precipitated at low pH's such as those of lactic acid swollen collagen in a manner that carboxymethylcellulose would not. A workable dough of the kind McKnight discloses would therefore not be preparable using the alginate of the invention. Moreover McKnight refers to a layer effect, quoting for example a 3 m$\mu$ layer on the casing. A typical thickness for the casings of the invention is two-thousandth of an inch (50 m$\mu$) and accordingly McKnight is applying only a small proportion of carboxymethylcellulose and as already noted such a proportion would have no effect in the process of the invention. McKnight states that the carboxymethylcellulose would migrate into the wall of the collagen tube and to a greater or lesser extent be present through the entire wall of the casing, but nevertheless apart from the differences between carboxymethylcellulose and alginate a modification of the kind achieved by premixing before extrusion could not be achieved by after treatment of already extruded casing, said casing having been set in the usual setting solutions used with collagen. The molecular accessability and reactivity of collagen in the hydrated swollen form of a dough is far greater than in the dehydrated and cohered form of a set casing and the invention makes use of this.

In the work leading to the invention we extruded casings from collagen itself, a matter of great difficulty, which were tough to eat and on frying tended to split and shrink and extrude the meat. We also extruded casings consisting solely of alginate. Such casings were extremely easy to extrude, in great contrast to the difficulty experienced with collagen dough itself, but gave casings which were baggy on the sausage and unattractive in appearance and other properties. Only in combining the properties of the two materials before extrusion did we get a material in which the difficult properties of the collagen in extrusion were modified by the alginate and the undesirable properties of the alginate in cooking were modified by the collagen, to give a casing which, as is desirable, shrank with the meat during cooking, but not so much that splits or extrusion of meat occurred.

These are the advantages of the process and of the casing produced and are attributable to the collagen/alginate interaction and structure.

The fibrous protein is present in the casing conveniently in the form of fibres having an average length of from 5 to 25 mm. Preferably the fibres have a length of from 10 to 22 mm. The diameter of a single fibre is preferably not greater than 0.1 mm.

The proportion of fibrous protein to polysaccharide in the casing is preferably within the range from 90:10 to 40:60; a particularly suitable protein:polysaccharide ratio is from 70:30 to 50:50, all these proportions being expressed on a dry weight basis.

Conveniently the casing is obtained by mixing together an aqueous slurry of the protein and a solution or suspension of the alginate, extruding the mixture so obtained to the desired form, and then setting or hardening the mixture in some way, suitably by use of a calcium precipitating agent for the alginate, so that the form of the casing is retained.

A preferred method of making casings according to the invention is as follows: a source of collagen is washed and bleached, and is then minced and milled down to a paste in which the fibres are dispersed to the required degree. During this process it is advisable to keep the temperature of the collagen below 40° C., preferably below 25° C., to minimise denaturation. The milled collagen is then dispersed in a solution of sodium alginate, and homogenised to shear the collagen bundles to the required dimensions. This process also promotes chemical interaction between the collagen and the alginate. The collagen/alginate mixture is then extruded through a suitable annular nozzle into a setting solution. A particularly suitable setting solution contains di- or trivalent metal ions which are able to bring about precipitation of the alginate as an insoluble salt. The preferred setting agent is a solution of calcium chloride. The formed casing is then inflated by air to assist further processing and, after washing to remove excess setting solution, the casing is dehydrated to a moisture content of 10% to 50%.

Although the invention relates particularly to casings such as food casings, it is believed that compositions comprising fibrous protein and polysaccharide as hereinbefore described are novel, and accordingly the invention is to be understood to include all such compositions.

The invention is further illustrated by the following example:

Trimmed cattle-hide limed tannery splits were throughly washed with sodium hypochlorite solution (0.02%) and 2 kilograms of the washed material (12% solids) were reduced to collagenous paste by passing them once through a high speed mincer and three times through a colloid mill set to progressively finer clearance, the last being a 0.05 mm. gap. The collagen was kept cool during the milling. The collagen paste so obtained was then mixed with 6 kilograms of 4% sodium alginate solution in water, first in a Lang disintegrator for 5 minutes and then in a colloid mill. The mixture was deaerated for 10 minutes at 70 mm. Hg and extruded vertically upwards at 400 grams per minute through an annulus 25 mm. in diameter and 0.6 mm. wide.

The casing was set by means of a bath of 12% calcium chloride (aqueous) solution, which bathed the casing both inside and out. On passing from the setting solution, the casing was inflated to a diameter of 30 mm. using air at a pressure of 32 gm./sq. cm.

A constant level of calcium chloride solution was maintained in the setting bath by replacement of the solution as it was removed with the casing. The inflated casing was drawn away from the nozzle by a conveyor belt, and was washed with water from overhead sprays.

Lengths of the casing were wound in an open spiral round a reel of 27 cm. diameter, inflated and dried in a current of air at 40° C. and 200 to 300 m. per minute, for 15 minutes. They were then transferred for conditioning to a humidity cabinet maintained at 85% relative humidity and 20° C. After about 4 hours the casing reached an equilibrium moisture content of 30 to 35% and was spooled ready for shirring and stuffing with sausage meat.

We claim:
1. A method of making a homogeneous edible fibrous protein casing consisting of milling a fibrous collagen protein to produce edible fibres, during which milling the temperature of the protein is maintained below 40° C., forming a dispersion of the milled edible collagen fibres with such a quantity of edible alginate that the proportion of fibrous portein to alginate in the dispersion is within the range 90:10 to 40:60 expresed on a dry weight basis under conditions causing chemical interaction between the protein and the alginate, extruding the dispersion into a calcium setting bath to form a casing comprising a continuous phase of alginate containing a network of collagen fibers, and washing and drying the casing.

2. A method according to claim 1, in which the milled edible collagen fibres are dispersed with such a quantity of alginate that the proportion of fibrous protein to alginate in the dispersion is within the range 70:30 to 50:50.

3. A method according to claim 1, in which the fibrous collagen protein is milled to produce edible fibres having an average length of 5 mm. to 25 mm.

4. A method according to claim 1, in which the fibrous collagen protein is milled to produce edible fibres having an average length of 10 mm. to 22 mm.

5. A homogeneous edible fibrous protein casing made in accordance with the method of claim 1.

6. A homogeneous edible fibrous protein casing made in accordance with the method of claim 3.

References Cited
UNITED STATES PATENTS

| | | | |
|---|---|---|---|
| 2,988,451 | 6/1961 | Zahn | 99—176 |
| 3,071,477 | 1/1963 | Klevens | 99—176 |
| 3,123,483 | 3/1964 | McKnight | 99—176 |

FOREIGN PATENTS

| | | |
|---|---|---|
| 560,848 | 7/1958 | Canada. |

OTHER REFERENCES

Whistler, "Industrial Gums" 1959, Published by Academic Press, New York, Page 10, Article entitled Polysaccarides With Carboxyl Groups.

HYMAN LORD, Primary Examiner